Jan. 9, 1945. F. C. KOLLATH 2,366,910
ELECTRIC SOLDERING IRON
Filed April 2, 1942 2 Sheets-Sheet 1
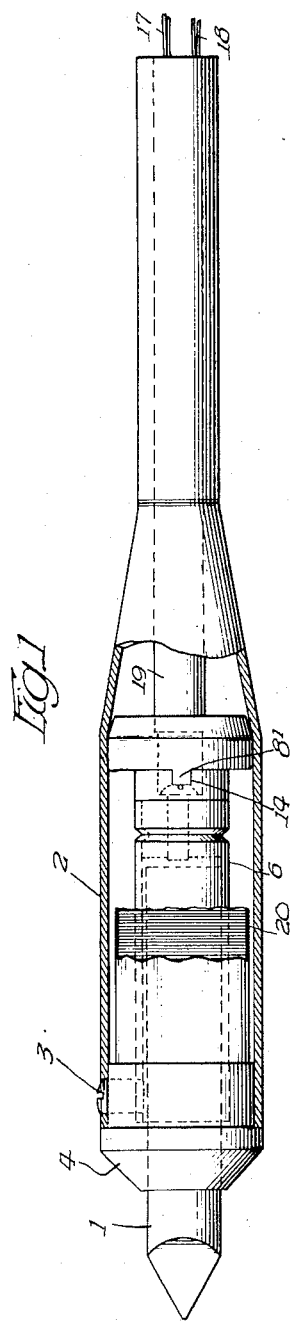
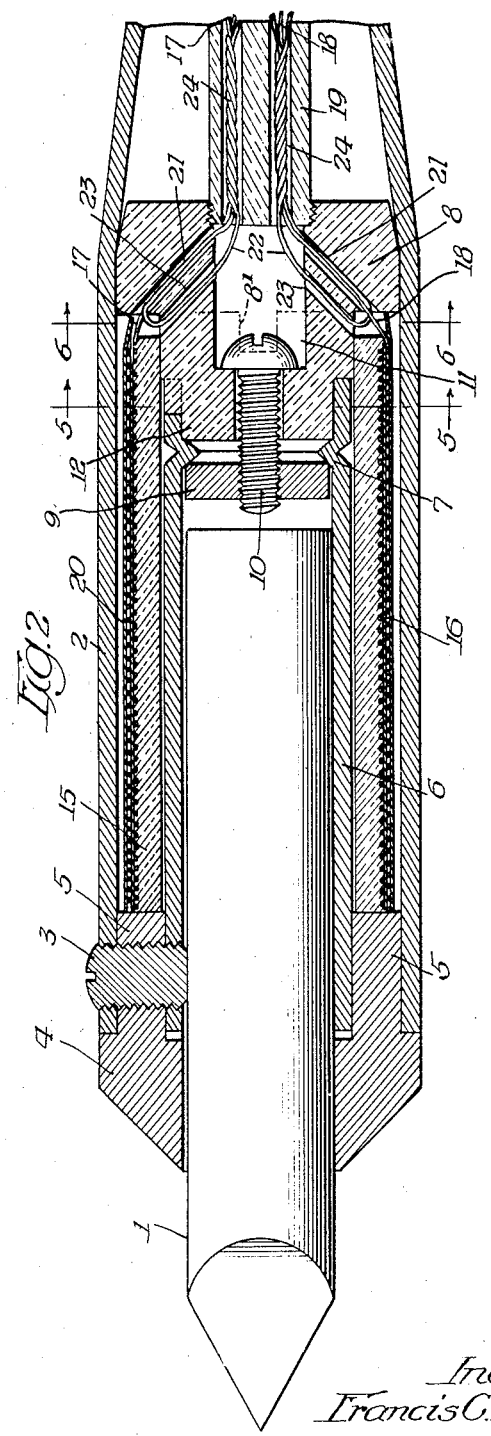
Inventor
Francis C. Kollath
By Spencer, Marzall, Johnston & Cook
Attys

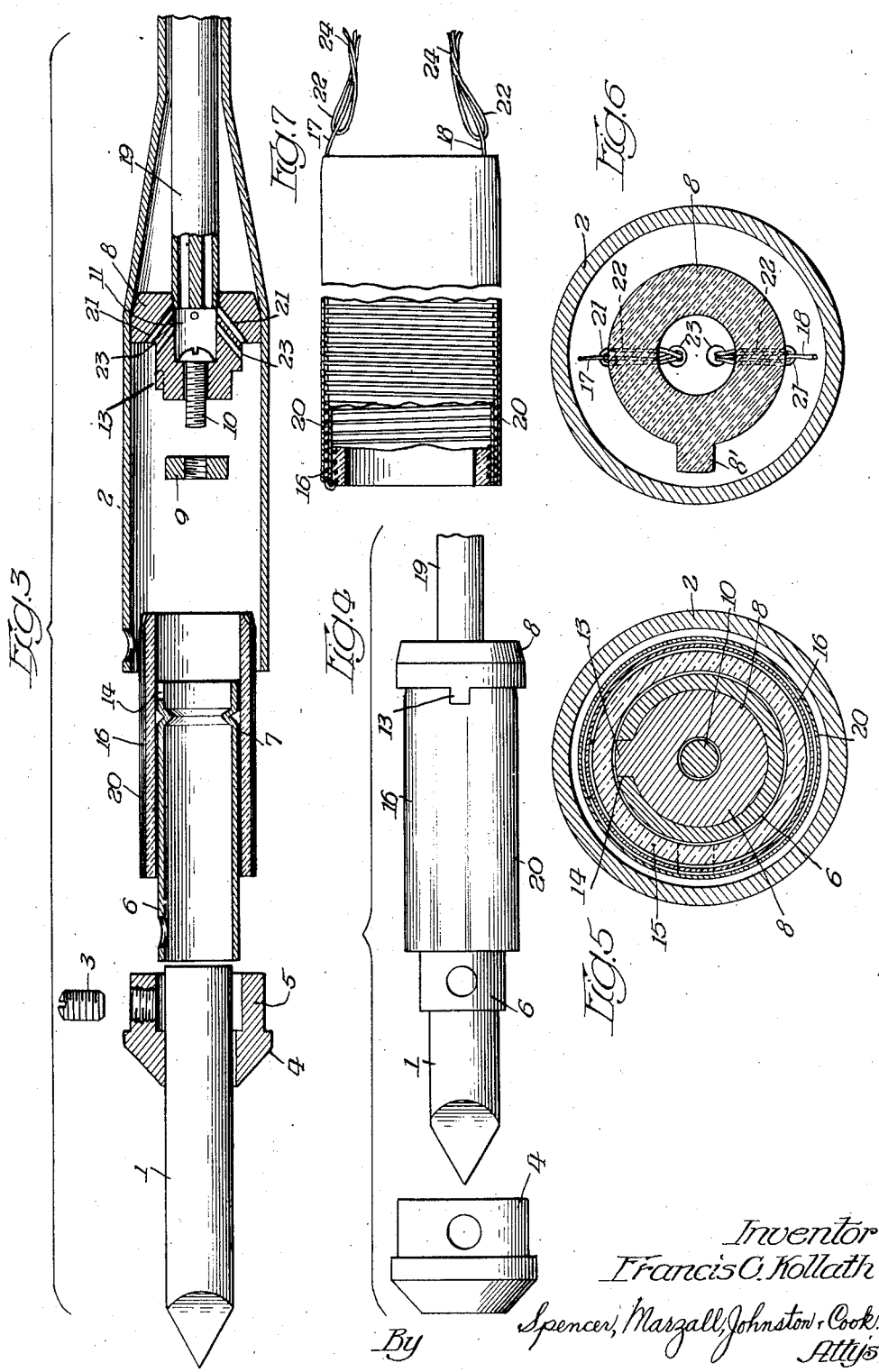

Patented Jan. 9, 1945

2,366,910

UNITED STATES PATENT OFFICE 2,366,910

ELECTRIC SOLDERING IRON

Francis C. Kollath, Chicago, Ill.

Application April 2, 1942, Serial No. 437,307

1 Claim. (Cl. 219—26)

This invention relates to a soldering iron and more particularly to a soldering iron in which the soldering tip is heated by means of an electrical element.

A primary object of the present invention is the provision of a new and improved soldering iron of this character.

A further object is the provision of an electric soldering iron having means for relieving or absorbing strain on the heating element and the conductors energizing the same, thus reducing the likelihood of breakage of the heating element and the connection between the heating element and its conductors, and enhancing the safety from short-circuiting incident to the use of the device.

A further object is the provision of an electrical soldering iron consisting of but relatively few parts, and in which the various parts are readily and simply assembled and maintained in assembled condtiion.

These and other objects will be apparent from the following description, the appended claim, and the accompanying drawings, which illustrate a selected embodiment of the invention and in which:

Fig. 1 is an elevational view of the soldering iron with portions thereof broken away to show the interior assembly;

Fig. 2 is an enlarged fragmentary sectional view of the invention shown in Fig. 1;

Fig. 3 is a disassembled sectional view of the soldering iron with conductors omitted;

Fig. 4 is a disassembled elevational view with the external sheath or housing removed;

Figs. 5 and 6 are sectional views taken on the lines 5—5 and 6—6, respectively, of Fig. 2; and Fig. 7 is a fragmentary view, part in elevation and part in section, showing the construction of the heating element in greater detail and further illustrating the means for relieving the strain ordinarily imposed on the heating element and the connection between it and its conductors.

Referring to the drawings, the soldering iron comprises a soldering member or tip 1 having an elongated body portion mounted within an enclosing sheath or casing 2 which may be of metal or other material suitable for the purpose. The soldering member is mounted in a predetermined position within the sheath 2 by means of a set screw 3 which is threadedly received within an opening provided in the end of sheath 2 and engages the body portion of the soldering member. An end closure or collar 4 surrounds the tip 1 at the end of the sheath 2 and is attached to the sheath by means of the set screw 3 which passes through a flange 5 of the collar. A heat conducting shield 6 surrounds the main body portion of the member 1 and is attached to the sheath 2 by the set screw 3 which is threaded through one end portion of the sleeve, the set screw 3 thereby maintaining all of said parts in assembled relationship.

Sleeve 6 is provided at its opposite end with a constricted portion 7 serving to connect the sleeve to a ceramic insulator or bushing 8. This connection is accomplished by means of a nut 9 having threaded engagement with an attaching bolt 10 having its head seated against an internal shoulder provided by a hollow bore 11 in the insulator 8. Tightening of the bolt 10 thus causes the nut 9 and a reduced neck portion 12 of insulator 8 to be drawn into clamping engagement with opposite sides of the constriction 7. The sleeve 6 overlaps the reduced neck portion 12 of the insulating bushing 8, and rotation between sleeve 6 and insulator 8 is prevented by means of a lug 13 on the insulator engaging within a notch 14 formed in the inner end of sleeve 6.

A ceramic or insulating sleeve 15 surrounds sleeve 6 between the collar 4 and the bushing 8 and carries on its external cylindrical surface a heating element 16 energized through wires or conductors 17 and 18 leading into the iron through a conduit 19. As best shown in Fig. 2 the conduit 19 may be screw threaded into the outer end of the insulating bushing 8. The heating element 16 may consist of any desired number of inter-connected coils or layers for giving the desired heat value, two such inter-connected layers being shown in Figs. 2 and 7, with the layers suitably spaced and enclosed within insulating material 20 such as mica or the like. The conductors 17 and 18 pass through suitably spaced openings 21 provided in the insulating bushing 8. The bushing 8 is also provided with a lug 8' which inter-fits with a suitable notch provided in the heating element 16 and prevents relative rotation between the bushing and heating element.

Due to the weight of the iron and the strain imposed on the conductors 17 and 18 and their connection with the heating element 16, difficulty has been encountered due to breakage and short-circuiting. In order to relieve the strain imposed upon the conductors and their connection with the heating element, the present invention provides means associated with the conductors for taking the strains and stresses. For this purpose a loop 22 of wire or other tension resisting material is looped through each of the openings 21 and supplemental openings 23 and has its ends twisted, braided or otherwise secured to the conductors 17 and 18, respectively, as indicated at 24, Figs. 2 and 7. The dimensions of the loops 22 are such as to take up any strain that might be imposed on the heating element and its connection with the conductors 17 and 18.

A simple and inexpensive electric soldering iron is thus provided having relatively few parts which are easily assembled and simply maintained in assembled condition. The conductors to the iron are anchored to a fixed bushing, thereby avoiding all strain on the conductors and their connection to the heating element, and preventing danger of breaking the connection and short-circuiting the device.

Changes may be made in the form, construction and arrangement of the parts without departing from the spirit of the invention; and the right is hereby reserved to make all such changes as fairly fall within the scope of the following claim.

The invention is hereby claimed as follows:

A soldering iron comprising an elongated casing, a sleeve of heat conducting material mounted in said casing, an elongated soldering tip mounted within said sleeve, a collar for closing one end of said casing, a set screw passing through said casing, said collar and said sleeve into engagement with said tip to secure the parts together, an insulating bushing mounted adjacent one end of said sleeve, said sleeve being provided with an inwardly extending crimped-like portion against which said bushing abuts, a screw threaded member extending longitudinally through said bushing and having threaded engagement with a nut-like member on the opposite side of said crimped-like portion of said sleeve to detachably connect the sleeve and bushing together, a heating element surrounding said sleeve between said collar and said bushing, and conductors for said heating element passing through said bushing.

FRANCIS C. KOLLATH.